(12) United States Patent
Lai

(10) Patent No.: US 10,303,603 B2
(45) Date of Patent: May 28, 2019

(54) LOW POWER MULTI-CORE COHERENCY

(71) Applicant: Microsoft Technology Licensing, LLC, Redmond, WA (US)

(72) Inventor: Patrick P. Lai, Fremont, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 15 days.

(21) Appl. No.: 15/621,870

(22) Filed: Jun. 13, 2017

(65) Prior Publication Data

US 2018/0357169 A1    Dec. 13, 2018

(51) Int. Cl.
| | | |
|---|---|---|
| G06F 12/08 | (2016.01) | |
| G06F 12/0808 | (2016.01) | |
| G06F 12/0815 | (2016.01) | |
| G06F 12/084 | (2016.01) | |
| G06F 12/0831 | (2016.01) | |
| G06F 12/10 | (2016.01) | |

(52) U.S. Cl.
CPC ........ G06F 12/0808 (2013.01); G06F 12/084 (2013.01); G06F 12/0815 (2013.01); G06F 12/0831 (2013.01); *G06F 12/10* (2013.01)

(58) Field of Classification Search
CPC . G06F 12/0815; G06F 12/084; G06F 12/0888
See application file for complete search history.

(56) References Cited

U.S. PATENT DOCUMENTS

| | | |
|---|---|---|
| 5,530,933 A | 6/1996 | Frink et al. |
| 6,622,214 B1 | 9/2003 | Vogt et al. |
| 7,263,586 B1 | 8/2007 | Kapil |
| 7,321,964 B2 | 1/2008 | Filippo et al. |
| 7,516,310 B2 | 4/2009 | Altman et al. |
| 7,921,253 B2 | 4/2011 | Saripalli |

(Continued)

FOREIGN PATENT DOCUMENTS

WO    2013081580 A1    6/2013

OTHER PUBLICATIONS

"Final Office Action Issued in U.S. Appl. No. 15/199,699", dated Sep. 19, 2018, 27 Pages.

(Continued)

*Primary Examiner* — Hal Schnee
(74) *Attorney, Agent, or Firm* — Alleman Hall Creasman & Tuttle LLP

(57) ABSTRACT

A special class of loads and stores access a user-defined memory region where coherency and memory orders are only enforced at the coherent point. Coherent memory requests, which are limited to user-defined memory region, are dispatched to the common memory ordering buffer. Non-coherent memory requests (e.g., all other memory requests) can be routed via non-coherent lower level caches to the shared last level cache. By assigning a private, non-overlapping, address spaces to each of the processor cores, the lower-level caches do not need to implement the logic necessary to maintain cache coherency. This can reduce power consumption and integrated circuit die area. This can also improve memory bandwidth and performance for applications with predominantly non-coherent memory accesses while still providing memory coherence for specific memory range(s)/applications that demand it.

20 Claims, 6 Drawing Sheets

(56) References Cited

U.S. PATENT DOCUMENTS

| | | | |
|---|---|---|---|
| 8,185,700 B2 | 5/2012 | Gimeno et al. | |
| 8,230,422 B2 | 7/2012 | Bohrer et al. | |
| 8,560,803 B2 | 10/2013 | Orf et al. | |
| 8,677,081 B1 | 3/2014 | Wentzlaff et al. | |
| 8,738,860 B1 | 5/2014 | Griffin et al. | |
| 8,868,833 B1* | 10/2014 | Bennett | G06F 12/084 711/118 |
| 9,009,541 B2 | 4/2015 | Gulati et al. | |
| 9,448,937 B1* | 9/2016 | Ahmad | G06F 12/0815 |
| 2002/0199063 A1 | 12/2002 | Chaudhry et al. | |
| 2004/0059872 A1 | 3/2004 | Genduso et al. | |
| 2005/0154805 A1 | 7/2005 | Steely et al. | |
| 2007/0022253 A1 | 1/2007 | Cypher et al. | |
| 2007/0180197 A1 | 8/2007 | Wright et al. | |
| 2007/0186053 A1 | 8/2007 | Chaudhry et al. | |
| 2009/0193197 A1* | 7/2009 | Stevens | G06F 12/0804 711/141 |
| 2009/0204769 A1* | 8/2009 | Heil | G06F 12/0888 711/139 |
| 2009/0327616 A1 | 12/2009 | Conway et al. | |
| 2010/0191920 A1* | 7/2010 | Fang | G06F 12/0835 711/146 |
| 2011/0320727 A1 | 12/2011 | Orf et al. | |
| 2012/0179876 A1 | 7/2012 | Guthrie et al. | |
| 2013/0268735 A1 | 10/2013 | Gibert codina et al. | |
| 2014/0089600 A1 | 3/2014 | Biswas et al. | |
| 2014/0189411 A1 | 7/2014 | Kanchana et al. | |
| 2014/0281197 A1 | 9/2014 | Niell et al. | |
| 2014/0281274 A1 | 9/2014 | Pokam et al. | |
| 2015/0026404 A1 | 1/2015 | Lilly et al. | |
| 2015/0089154 A1 | 3/2015 | Busaba et al. | |
| 2015/0149722 A1 | 5/2015 | Kannan et al. | |
| 2015/0220440 A1* | 8/2015 | Aga | G06F 12/0835 711/141 |
| 2015/0347297 A1 | 12/2015 | Hagersten et al. | |
| 2015/0378731 A1 | 12/2015 | Lai et al. | |
| 2016/0092223 A1* | 3/2016 | Wang | G06F 9/3004 712/208 |
| 2016/0092360 A1* | 3/2016 | Moll | G06F 12/0811 711/144 |
| 2016/0328322 A1 | 11/2016 | Biswas et al. | |
| 2016/0378659 A1 | 12/2016 | Gschwind et al. | |
| 2017/0010656 A1 | 1/2017 | Ananthakrishnan et al. | |
| 2018/0004660 A1 | 1/2018 | Lai et al. | |

OTHER PUBLICATIONS

"Non Final Office Action Issued in U.S. Appl. No. 15/199,699", dated Mar. 8, 2018, 31 Pages.

Bell, Gordon B., "Latency- and Error-Tolerant Redundant Execution", Thesis Submitted in Doctoral Dissertation in University of Wisconsin-Madison, 2007, 176 Pages.

Garzaran, et al., "Tradeoffs in Buffering Speculative Memory State for Thread-Level Speculation in Multiprocessors", In Journal of ACM Transactions on Architecture and Code Optimization, vol. 2, Issue 3, Sep. 1, 2005, pp. 247-279.

Kim, et al., "An efficient software shared virtual memory for the single-chip cloud computer", In Proceedings of the Second Asia-Pacific Workshop on Systems, Jul. 11, 2011, 5 Pages.

"International Search Report Issued in PCT Patent Application No. PCT/US2018/034029", dated Aug. 20, 2018, 11 Pages.

* cited by examiner

LOW POWER MULTI-CORE COHERENCY

BACKGROUND

Integrated circuits, and systems-on-a-chip (SoC) may include two or more independent processing units (a.k.a., "cores") that read and execute instructions. These multi-core processing chips may cooperate to implement multiprocessing. The designers of these chips may select various techniques to couple the cores in a device so that they may share instructions and/or data.

SUMMARY

Examples discussed herein relate to an integrated circuit that includes a plurality of processor cores that share a common last-level cache and a shared memory order buffer. The plurality of processor cores each include a non-coherent memory order buffer. A first processor core being one of the plurality of processor cores. The shared memory order buffer receives coherent store transactions sent by the plurality of processor cores. The common last-level cache receives store transactions sent by the non-coherent memory order buffers of the plurality of processor cores. The common last-level cache also receives store transactions, from the shared memory order buffer, that correspond to the coherent store transactions sent by the plurality of processor cores.

In another example, a method of operating a processing system includes receiving, from a plurality of processor cores, a plurality of non-coherent store transactions at a common last-level cache. A first processor core is one of the plurality of processor cores. The method also includes receiving, from the plurality of processor cores, a plurality of coherent store transactions at a memory order buffer. The method also includes issuing, by the first processor core and directly to the memory order buffer, at least a first coherent store transaction. The first coherent store transaction to be processed by the memory order buffer before being sent to the last-level cache. The method also includes issuing, by the first processor core, at least a first non-coherent store transaction. The first non-coherent store transaction is processed by at least one lower-level cache before being sent to the last-level cache. The method also includes receiving, at the last-level cache, the non-coherent store transaction and data stored by the coherent store transaction.

In another example, a processing system includes a plurality of processing cores, a last-level cache, and a memory order buffer. The plurality of processing cores are each coupled to at least a first level cache. The last-level cache is separate from the first level cache. The last-level cache is receives a block of non-coherent store data from the first level cache. The memory order buffer is coupled to the last-level cache. The memory order buffer receives a block of coherent store data from a first processing core of the plurality of processing cores without the block of coherent store data being processed by the first level cache.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or an integrated circuit.

In a system that uses a write-invalidate protocol, writes to a line that resides in the last-level cache (e.g., the level 3 cache in a system with three levels of cache) invalidates other copies of that cache line at the other cache levels. For example, a write to a line residing in the level 3 (L3) cache invalidates other copies of that cache line that are residing in the L1 and/or L2 caches of the cores and/or core clusters (aside from the copy already on a cache within the requesting core). This makes stores to cache lines that are shared with lower cache levels both time consuming and resource expensive since messages need to be sent to (e.g., snoop transactions), and received from (e.g., snoop responses), each of the caches at each of the cache levels.

In an embodiment, a special class of loads and stores access a user-defined memory region where coherency and memory orders are only enforced at the coherent point. Coherent memory requests, which are limited to user-defined memory region, are dispatched to the common memory ordering buffer. Non-coherent memory requests (e.g., all other memory requests) can be routed via non-coherent lower level caches to the shared last level cache. By assigning a private, non-overlapping, address spaces to each of the processor cores, the lower-level caches do not need to implement the logic necessary to maintain cache coherency. This can reduce power consumption and integrated circuit die area.

As used herein, the term "processor" includes digital logic that executes operational instructions to perform a sequence of tasks. The instructions can be stored in firmware or software, and can represent anywhere from a very limited to a very general instruction set. A processor can be one of several "cores" that are collocated on a common die or integrated circuit (IC) with other processors. In a multiple processor ("multi-processor") system, individual processors can be the same as or different than other processors, with potentially different performance characteristics (e.g., operating speed, heat dissipation, cache sizes, pin assignments, functional capabilities, and so forth). A set of "asymmetric" processors refers to a set of two or more processors, where at least two processors in the set have different performance capabilities (or benchmark data). As used in the claims below, and in the other parts of this disclosure, the terms "processor" and "processor core" will generally be used interchangeably.

Figure 1A:
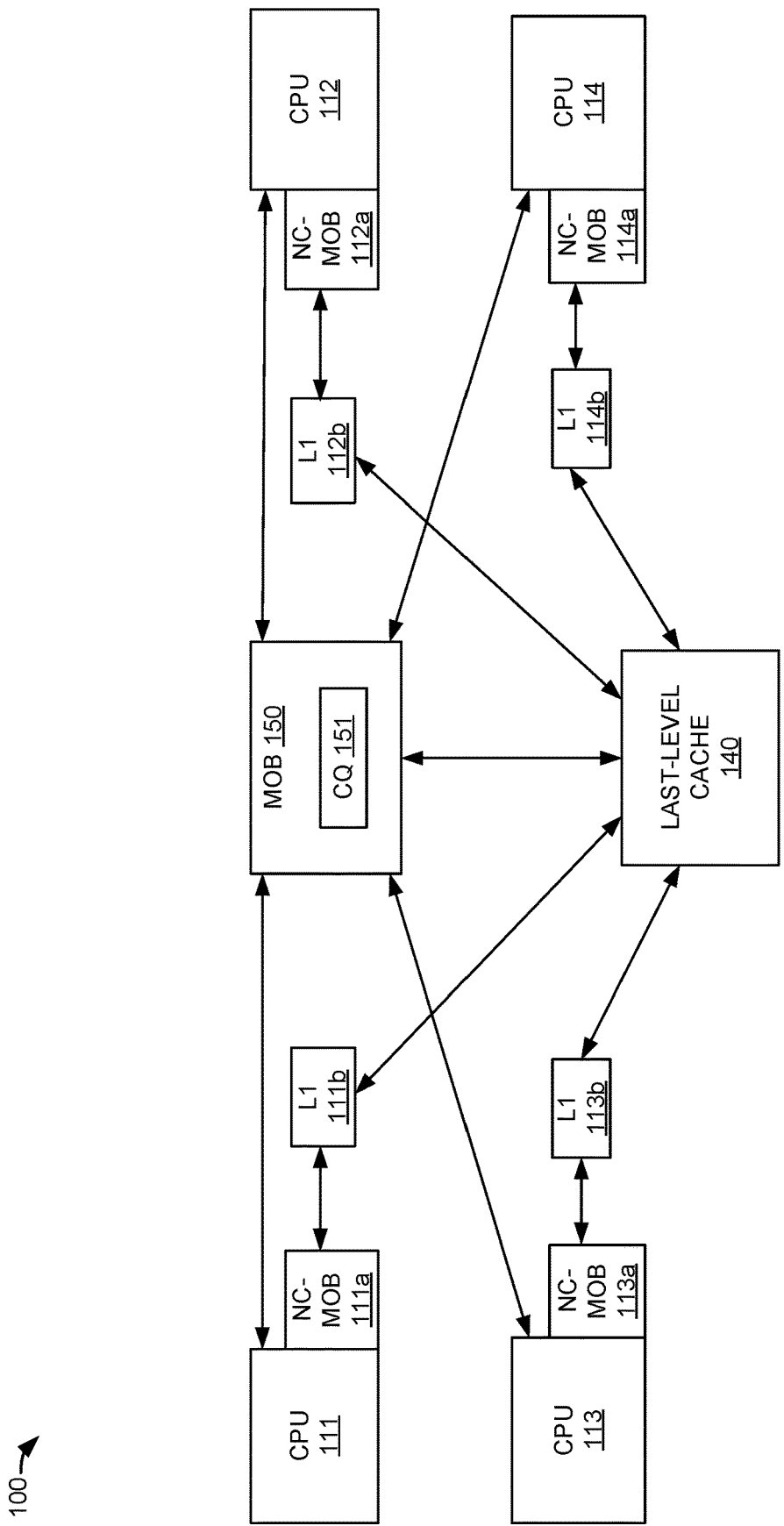
FIG. 1A is a block diagram illustrating a processing system.

FIG. 1A is a block diagram illustrating a processing system. In FIG. 1, processing system 100 includes processor (CPU) 111, non-coherent memory order buffer (NC-MOB) 111a, level 1 (L1) cache 111b, processor 112, non-coherent memory order buffer 112a, L1 cache 112b, processor 113, non-coherent memory order buffer 113a, L1 cache 113b, processor 114, non-coherent memory order buffer 114a, L1 cache 114b, last-level cache 140, and common memory order buffer (MOB) 150. Common memory order buffer 150 includes conflict queue 151. Common memory order buffer 150 is operatively coupled to last-level cache 140.

CPU 111 includes non-coherent memory order buffer 111a. Non-coherent memory order buffer 111a is operatively coupled to L1 cache 111b. L1 cache 111b is operatively coupled to last-level cache 140. CPU 11 is also operatively coupled to memory order buffer 150. CPU 112 includes non-coherent memory order buffer 112a. Non-coherent memory order buffer 112a is operatively coupled to L1 cache 112b. L1 cache 112b is operatively coupled to last-level cache 140. CPU 11 is also operatively coupled to memory order buffer 150. CPU 113 includes non-coherent memory order buffer 113a. Non-coherent memory order buffer 113a is operatively coupled to L1 cache 113b. L1 cache 113b is operatively coupled to last-level cache 140. CPU 11 is also operatively coupled to memory order buffer 150. CPU 114 includes non-coherent memory order buffer 114a. Non-coherent memory order buffer 114a is operatively coupled to L1 cache 114b. L1 cache 114b is operatively coupled to last-level cache 140. CPU 11 is also operatively coupled to memory order buffer 150. Processing system 100 may include additional processors, interfaces, caches, links, and/or input/output (IO) processors (not shown in FIG. 1.)

In an embodiment, non-coherent memory accesses by respective processors 111-114 are processed by the corresponding non-coherent memory order buffer 111a-114a. Because non-coherent memory order buffers 111a-114a only handle non-coherent memory accesses, non-coherent memory order buffers 111a-114a can have reduced power consumption and smaller areas when compared to memory order buffers that need to support snoops and/or other cache coherency operations.

Coherent memory accesses by respective processors 111-114 are sent to common memory order buffer 150. Coherent memory accesses by respective processors 111-114 are sent to common memory order buffer 150 without being processed by respective L1 caches 111b-114b (or non-coherent memory order buffers 111a-114a.) Memory ordering and data forwarding between processors 111-114 is performed by common memory order buffer 150.

Last-level cache 140 receives store transactions from processors 111-114. At least some of these store transactions may be indicated (e.g., by the contents of the transaction itself, or some other technique) to be written directly to last-level cache 140. In this case, processing system 100 (and last-level cache 140, in particular) does not query (i.e., 'snoop') the lower level caches (e.g., the L1 caches of any of processors 111-114) to determine whether any of these lower level caches has a copy of the affected cache line.

Coherent store transactions are processed by common memory order buffer 150. In this case, since coherent transactions/data are directed to common memory order buffer 150 for processing are not sent through the lower level caches (e.g., the L1 caches of any of processors 111-114), common memory order buffer 150 can perform memory ordering and data forwarding without querying (i.e., 'snoop') the L1 caches 111b-114b.

In an embodiment, the store transactions may be indicated to be coherent based on the type of store instruction that is being executed by the processor 111-114 issuing the transaction. In other words, the program running on a processor 111-114 may elect to have a particular store operation go directly to common memory order buffer 150 by using a first type of store instruction that indicates the store data is to subject to coherency restrictions and/or processing. Likewise, the program running on a processor 111-114 may elect to have a particular store operation be processed (e.g., be cached) non-coherently by lower level caches (e.g., L1 caches 111b-114b) by using a second type of store instruction that indicates the store data should pass through the lower level caches.

In an embodiment, the store transactions may be indicated to be written directly to common memory order buffer 150 based on the addresses targeted by these store transactions being within a configured addressed range. In other words, store operations that are addressed to a configured address range are sent by a processor 111-114 of processing system 100 directly to common memory order buffer 150. Likewise, store operations that are addressed to a different address range may be processed by the lower level caches. One or both of these address ranges may be configured, for example, by values stored in memory and/or registers in processing system 100 (and processors 111-114, in particular.) These registers and/or memory may be writable by one or more of processors 111-114.

In an embodiment, the address ranges that determine whether a store operation will be sent directly to common memory order buffer 150 can correspond to one or more physical or virtual memory pages. In this case, a page-table entry may store one or more indicators that determine whether stores directed to the corresponding memory page are to be sent directly to common memory order buffer 150.

Thus, it should be understood that processing system 100 implements a way of storing data into cache memory that can be used for frequently shared data. For the frequently shared data, the store operation associated with this data is indicated to be stored through direct to the coherence point (which is located at common memory order buffer 150.) This technique eliminates snoops to the lower level caches thereby reducing power consumption. This technique allows store-to-load forwarding by MOB 150 since all cache line access to the relevant (i.e., coherent) physical address are mapped to the same coherence point (i.e., MOB 150). MOB 150 may also enforce write ordering in a manner consistent with the Instruction Set Architecture (ISA) of one or more of processors 111-114.

In an embodiment, processor cores 111-114 share a last-level cache 140. Each of processor cores 111-114 include a respective non-coherent memory order buffer 111a-114a. Shared memory order buffer 150 receives coherent store transactions sent by processor cores 111-114. Last-level cache 140 receives store transactions sent by the non-coherent memory order buffers 111a-114a. Last-level cache 140 also receives store transactions, from memory order buffer 150, that correspond to the coherent store transactions sent by the non-coherent memory order buffers 111a-114a of processors 111-114.

The store transaction sent by the non-coherent memory order buffers 111a-114a include store transactions that have been processed by at least one lower-level cache before being sent to last-level cache 140. In other words, store transactions sent by the non-coherent memory order buffers 111a-114a to last-level cache 140 may be processed (and stored) by respective L1 caches 111b-114b before being ultimately sent to last-level cache 140. The store transactions sent by the non-coherent memory order buffers 111a-114a may be processed by L1 caches 11b-114b before being sent to last-level cache 140 based at least in part on addresses targeted by the store transactions sent by the non-coherent memory order buffers 111a-114a being within a configured address range. This configured address range may be hardwired into system 100. This configured address range may be user, program, and/or operating system selectable. For example, the non-coherent store transactions sent by processor cores 111-114 may be sent through the lower level caches (e.g., L1 caches 111b-114b) to last-level cache 140 based at least in part on addresses targeted by the store transactions being within an address range specified by at least one register that is writable by one or more of processors 111-114. In another example, the configured address range may correspond to at least one memory page.

The coherent store transactions sent by processor cores 111-114 are sent directly to memory order buffer 150. The coherent store transactions sent by processor cores 111-114 may be sent directly to memory order buffer 150 based at least in part on addresses targeted by the coherent store transactions being within a configured address range. This configured address range may be hardwired into system 100. This configured address range may be user, program, and/or operating system selectable. For example, the coherent store transactions sent by processor cores 111-114 may be sent directly to memory order buffer 150 based at least in part on addresses targeted by the coherent store transactions being within an address range specified by at least one register that is writable by one or more of processors 111-114. In another example, the configured address range may correspond to at least one memory page.

In an embodiment, last-level cache 140 receives, from processor cores 111-114, non-coherent store transactions. These non-coherent store transactions may have been sent through, processed by, and/or stored by a lower level cache (e.g., L1 caches 111b-114b.) Memory order buffer 150 receives, from processor cores 111-114, coherent store transactions. These coherent store transactions are not sent through, processed by, and/or stored by a lower level cache (e.g., L1 caches 111b-114b.)

A processor core 111-114 (e.g., processor core 111) may issue directly to memory order buffer 150, at least a first coherent store transaction. This first coherent store transaction is processed by memory order buffer 150 before being sent to last-level cache 140. The processor core 111-114 may also issue at least a first non-coherent store transaction. This first non-coherent store transaction is sent to, and processed by, at least one lower-level cache (e.g., one of L1 caches 111b-114b) before being sent to last-level cache 140. Last-level cache 140 receives the non-coherent store transaction (e.g., from L1 cache 111b) and data stored by the coherent store transaction (e.g., from memory order buffer 150.)

The processor core 111-114 may issue the first coherent store transaction based on an address corresponding to the target of a store instruction being executed by the processor core 111-114 falling within a configured address range. This address range may correspond to at least one memory page. A page table entry associated with the at least one memory page may include an indicator that the processor core 111-114 is to issue transactions to the address range (i.e., memory pages) as coherent store transactions. In an embodiment, processors 111-114 may receive, from a register written by a one of processors 111-114, an indicator that corresponds to at least one limit of the configured address range.

The processor core 111-114 may issue the first non-coherent store transaction based on an address corresponding to the target of a store instruction being executed by the processor core 111-114 falling within a configured address range. This address range may correspond to at least one memory page. A page table entry associated with the at least one memory page may include an indicator that the processor core 111-114 is to issue transactions to the address range (i.e., memory pages) as non-coherent store transactions. In an embodiment, processors 111-114 may receive, from a register written by a one of processors 111-114, an indicator that corresponds to at least one limit of the configured address range.

In an embodiment, processor cores 111-114 are each coupled to at least first level L1 caches 111b-114b. Last-level cache 140 is separate from first level L1 caches 111b-114b. Last-level cache 140 may receive blocks of non-coherent store data from L1 caches 111b-114b. Memory order buffer 150 is coupled to last-level cache 140. Memory order buffer 150 receives blocks of coherent store data from processor cores 111-114. Memory order buffer 150 receives blocks of coherent store data from processor cores 111-114 without these blocks of coherent store data being processed by L1 caches 111b-114b. In other words, coherent store data is sent by processors 111-114 to memory order buffer 150 (which may be co-located with last-level cache 140) without first passing through L1 caches 111b-114b. By bypassing L1 caches 111b-114b for coherent transactions, L1 caches 111b-114b can use a simple design and that consumes less power than L1 caches that implement the circuitry necessary to process coherent transactions (e.g., stores, snoops, etc.)

In various embodiments, an address range may determine whether a block of coherent store data is to be sent to memory order buffer 150 without being processed by a first level cache 111b-114b. An indicator in a page table entry may determine whether a block of coherent store data is to be sent to memory order buffer 150 without being processed by a first level cache 111b-114b. Similarly, an indicator in a page table entry may determine whether a block of non-coherent store data is to be sent to last-level cache 140 without being processed by memory order buffer 150.

Figure 1B:
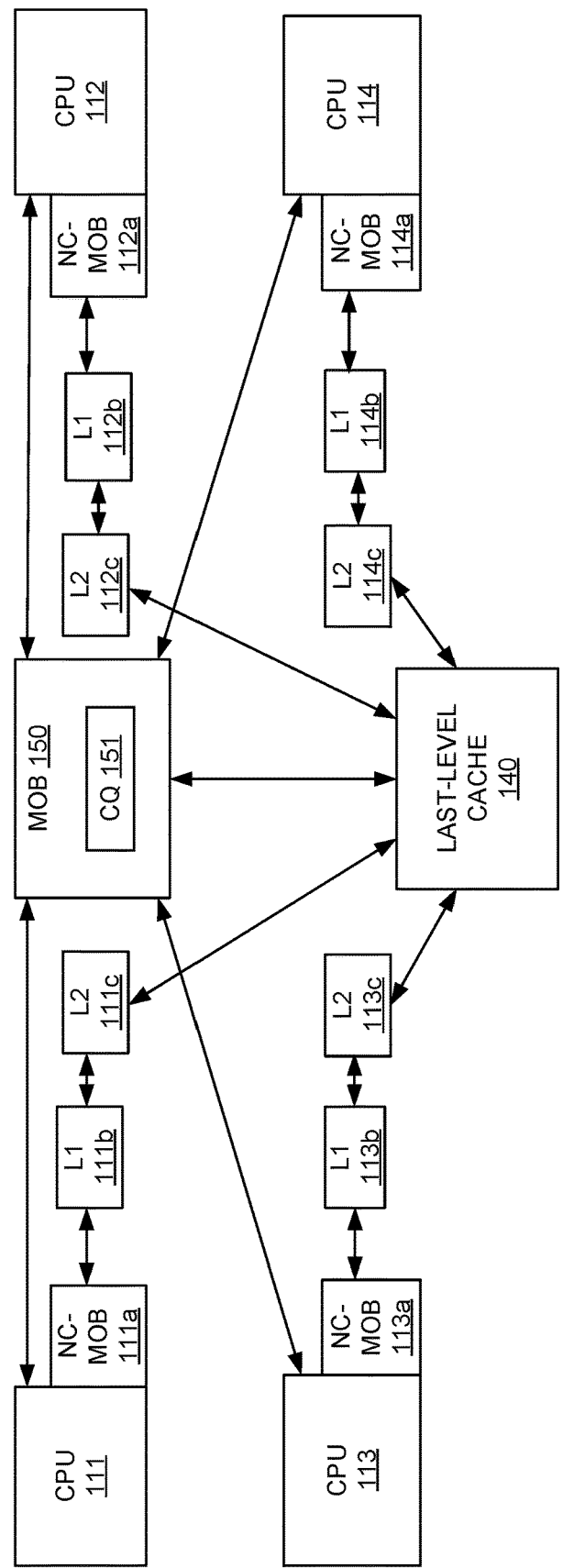
FIG. 1B is a block diagram illustrating a processing system with additional cache levels.

As discussed herein, memory order buffer 150 may receive blocks of coherent store data from processor cores 111-114 without these blocks of coherent store data being processed by lower level caches. Last-level cache 140 may receive non-coherent data that has been processed by lower level caches. FIG. 1A illustrates a system with a single level of caches (i.e., L1 caches 111b-114b) between non-coherent memory order buffers 111a-114a and last-level cache 140. FIG. 1B is a block diagram illustrating a processing system with additional cache levels. In particular, system 101 in FIG. 1B includes a second level of caches (L2 caches 111c-114c) disposed between L1 caches 111b-114b and last-level cache 140. System 101 can be configured and operated as described herein with reference to Figures.

Figure 2:
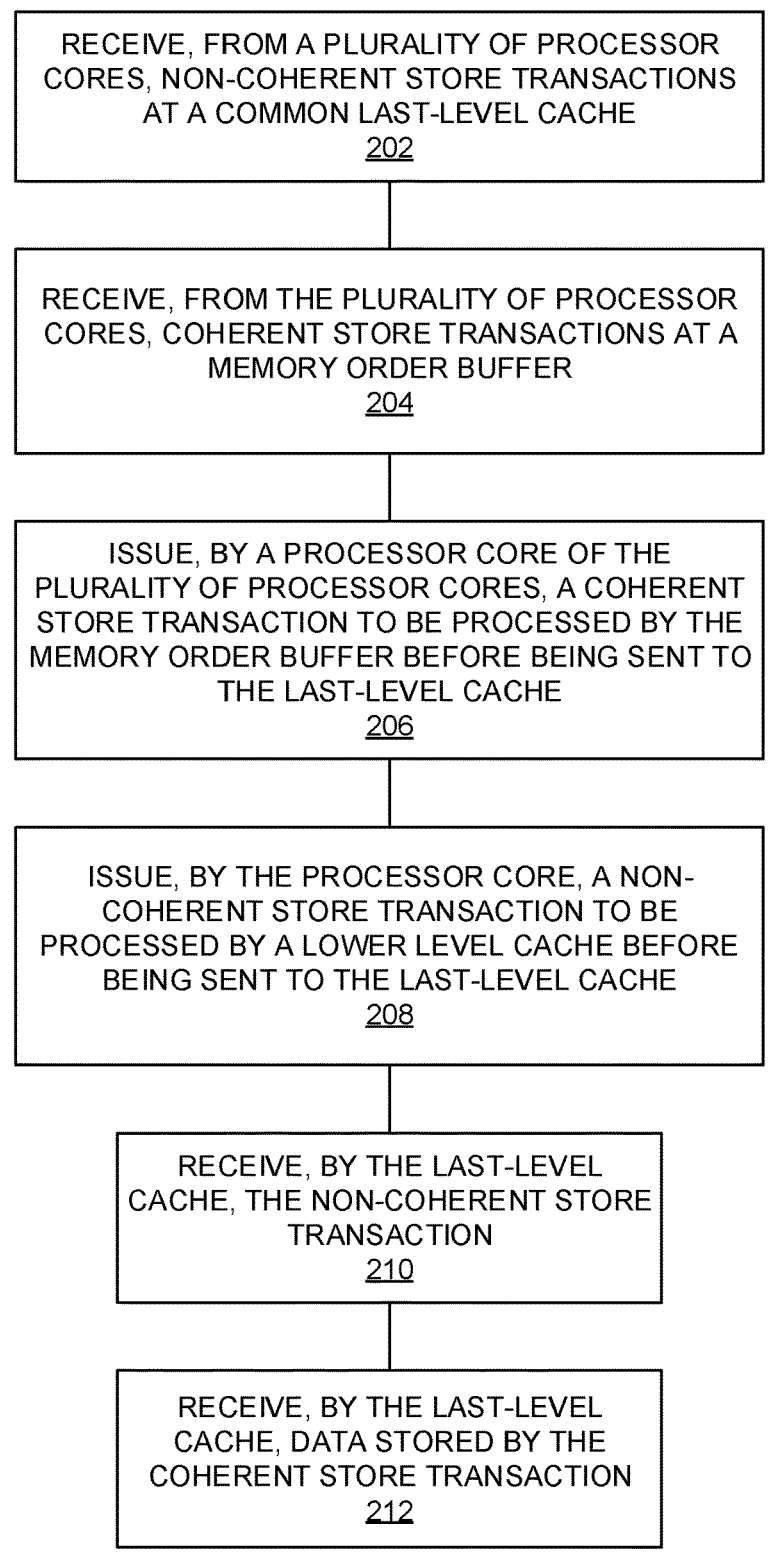
FIG. 2 is a flowchart illustrating a method of operating a processing system.

FIG. 2 is a flowchart illustrating a method of operating a processing system. The steps illustrated in FIG. 2 may be performed by one or more elements of processing system 100, system 101, and/or their components. From a plurality of processor cores, a plurality of non-coherent store transactions are received at a common last-level cache (202). For example, last-level cache 140 may receive store transactions from processors 111-114 (e.g., via non-coherent memory order buffers 111a-114a and L1 caches 111b-114b, and/or L2 caches 111c-114c.)

From the plurality of processor cores, a plurality of coherent store transactions are received at a memory order buffer (204). For example, memory order buffer 150 may receive store transactions directly from processors 111-114 (e.g., by bypassing non-coherent memory order buffers 111a-114a and L1 caches 111b-114b, and/or L2 caches 111c-114c.)

By a processor core of the plurality of processor cores, a coherent store transaction is issued that is indicated to be written directly to the memory order buffer (206). For example, processor 111 may issue a store transaction. This store transaction may be indicated to be a coherent store transaction that is to be sent directly to memory order buffer 150. This store transaction may be, for example, indicated to be to be sent directly to memory order buffer 150 based on the type of store instruction executed by processor 111. In another example, this store transaction may be indicated to be to be sent directly to memory order buffer 150 based on the addresses targeted by the store transactions being within a configured addressed range. The address range(s) may be configured, for example, by values stored in memory and/or registers in processing system 100 (and processor 111, in particular.) These registers and/or memory may be writable by processor 111. In another example, the address range(s) that determine whether this store operation will be sent directly to memory order buffer 150 can correspond to one or more physical or virtual memory pages. For example, a page-table entry may store one or more indicators that determine whether or not store operations directed to the corresponding memory page are to be sent directly to be sent directly to memory order buffer 150.

By the processor core, a non-coherent store transaction is issued that is indicated to be processed by a lower-level cache before being sent to the last-level cache (208). For example, processor 111 may issue a store transaction that is to be processed by the L1 cache of processor 111 and any intervening caches (e.g., L2 cache 111c.) This store transaction may be, for example, indicated to be processed (e.g., be cached) by lower level caches based on the type of store instruction executed by processor 111. In another example, this store transaction may be indicated to be processed by the lower level caches based on the addresses targeted by the store transactions being within a configured addressed range. The address range(s) may be configured, for example, by values stored in memory and/or registers in processing system 100 (and processor 111, in particular.) These registers and/or memory may be writable by processor 111. In another example, the address range(s) that determine whether this store operation will be processed by lower level caches can correspond to one or more physical or virtual memory pages. For example, a page-table entry may store one or more indicators that determine whether or not store operations directed to the corresponding memory page are to be processed by lower level caches.

By the last-level cache, the non-coherent store transaction is received (210). For example, last-level cache 140 may receive the non-coherent store transaction from L1 cache 111b. Last-level cache 140 may also receive data that has been processed by other lower cache levels (e.g. L2 cache 111c.)

By the last-level cache, the data stored by the coherent store transaction is received (212). For example, MOB 150 may receive the coherent store transaction directly from processor 111. MOB 150 may process the store transaction in order to, for example, resolve conflicts and/or unwind speculative stores. After processing, MOB 150 may provide the coherent store data to last-level cache 140. Last-level cache 140 may eventually evict the coherent (and non-coherent) store data to a main memory.

Figure 3:
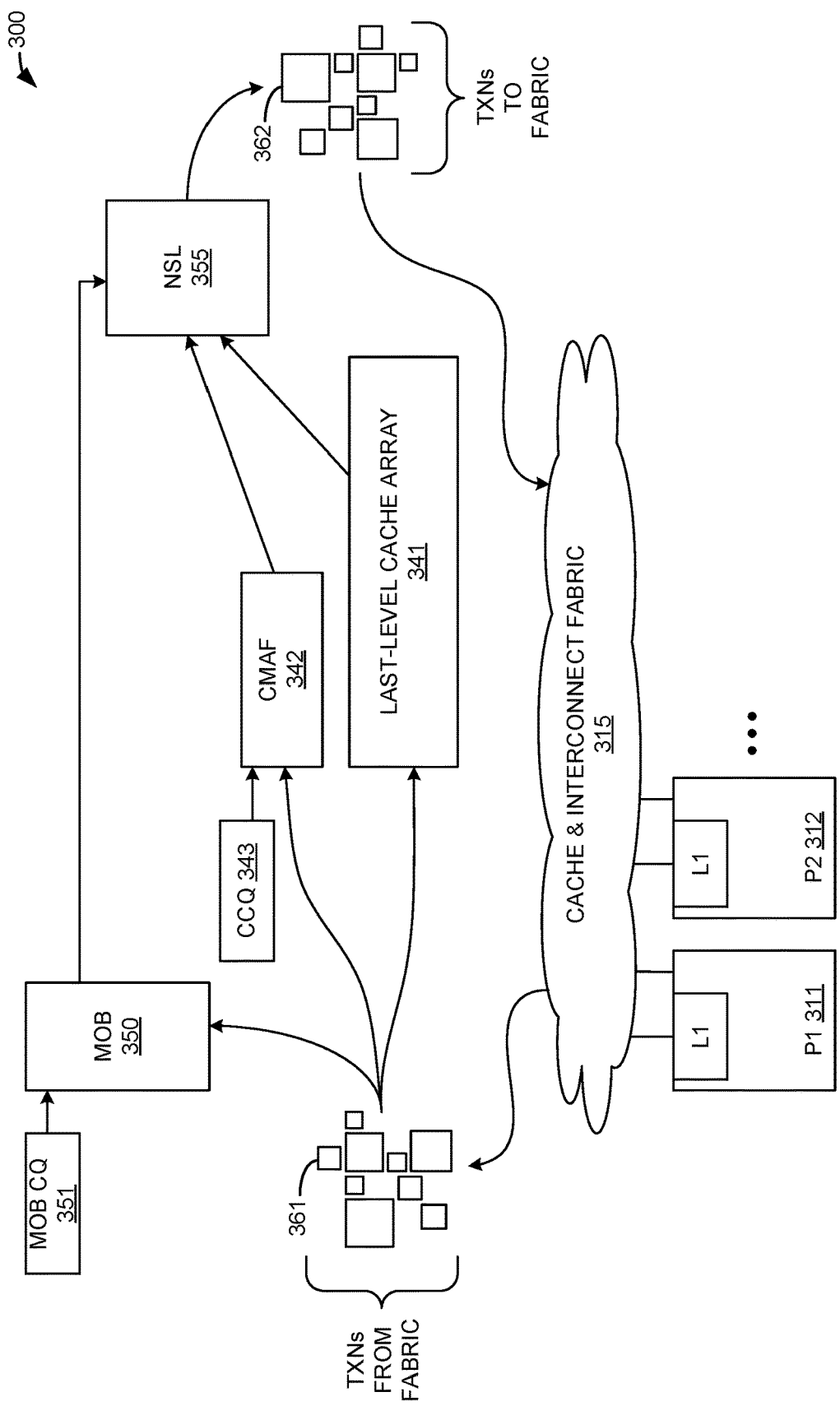
FIG. 3 is a diagram illustrating a memory order buffer and last-level cache pipeline coupled to multiple processors.

FIG. 3 is a diagram illustrating a memory order buffer and last-level cache pipeline coupled to multiple processors. In FIG. 3, processing system 300 comprises processor 311, processor 312, cache and interconnect fabric 315, memory order buffer (MOB) 350, memory order buffer conflict queue (MOB CQ) 351, last-level cache array 341, cache miss address file (CMAF) 342, cache conflict queue (CCQ) 343, and next state logic (NSL) 355. Processor 311 includes a lower level cache L1. Processor 312 includes a lower level cache L1. Processors 311-312 correspond to, and are configured to operate, as described herein with respect to processors 111-114. Also illustrated in FIG. 3 are transactions 361 and transactions 362.

Processor 311 and processor 312 are operatively coupled to fabric 315. Fabric 315 provides transactions 361 to last-level cache 340. Last-level cache 340 provides transactions 362 to fabric 315. Fabric 315 may send transactions 362 (e.g., one or more transactions containing read data) to one or more of processors 311 and 312.

Transactions 361 originate from one or more of processors 311 and 312. Transactions 361 may include store transactions that are sent directly from a processor 311 or 312 to MOB 350 without being processed by lower level caches (e.g., the L1 cache of processor 311 or the cache levels of fabric 315, if any). Transactions 361 may include store transactions that are sent from a lower level cache (e.g., the L1 cache of processor 311 or the cache levels of fabric 315, if any). Transactions 361 may include load transactions that are directed to access data recently sent to last-level cache 340.

Transactions 361 are distributed by processors 311-312 to MOB 350, CMAF 342, and cache array 341. MOB 350 holds coherent store transactions 361 until these store transactions are written to last-level cache array 341. A load transaction 361 that corresponds to a coherent store transaction in MOB 350 causes MOB 350 to provide the data from the store transaction directly to next state logic 355—thereby bypassing CMAF 342 and cache array 341. NSL 355 outputs transactions 362 to fabric 315. Thus, it should be understood that system 300 may implement store-to-load forwarding. The forwarded data may include data that was sent directly from a processor 311 or 312 to MOB 350 without being processed by lower level caches. The forwarded data may include data that was sent to last-level cache array 341 after being stored in one or more lower level caches (e.g., the L1 cache of processor 311 or the cache levels of fabric 315, if any).

Figure 4:
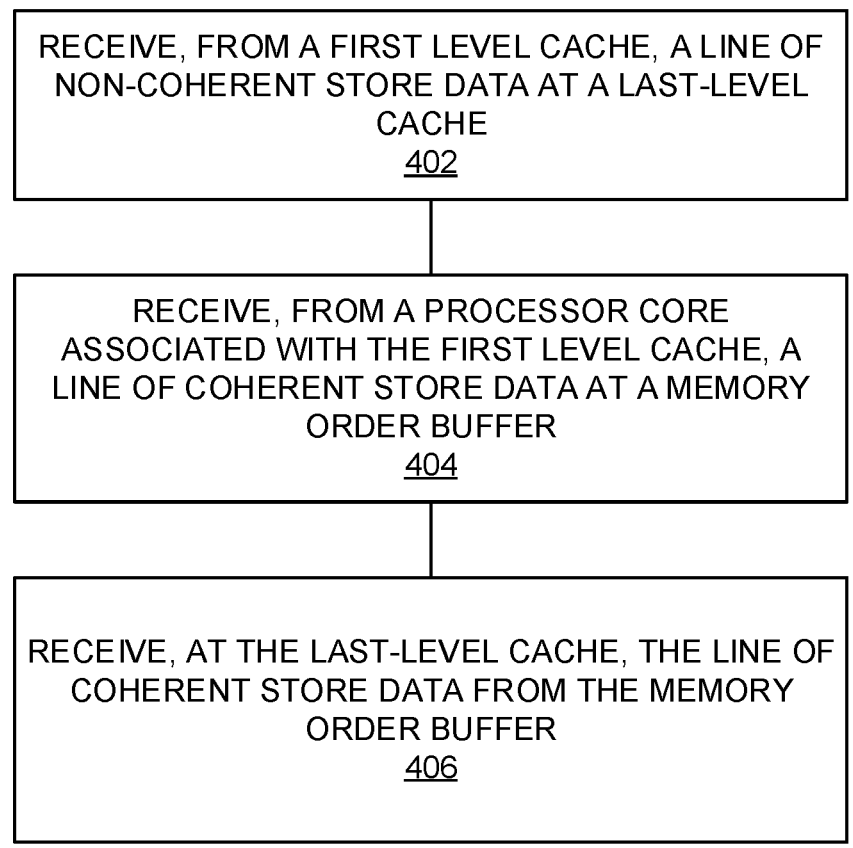
FIG. 4 is a flowchart illustrating a method of processing coherent and non-coherent store transactions.

FIG. 4 is a flowchart illustrating a method of processing coherent and non-coherent store transactions. The steps illustrated in FIG. 4 may be performed by one or more elements of system 100, system 101, system 300, and/or their components. From a first level cache, a line of non-coherent data is received at a last-level cache (402). For example, last-level cache 140 may receive, from L1 cache 111b, a line of non-coherent store data.

From a processor core associated with the first level cache, a line of coherent store data may be received at a memory order buffer (404). For example, memory order buffer 150 (which may be co-located and/or part of last level cache 140) may receive a line of coherent store data directly from processor 111. At the last-level cache, the line of coherent store data is received from the memory order buffer (406). For example, MOB 150 may process the line of coherent store data in order to, for example, resolve conflicts and/or unwind speculative stores. After processing, MOB 150 may provide the line of coherent store data to last-level cache 140. Last-level cache 140 may eventually evict the coherent line to a main memory.

The methods, systems and devices described herein may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 101, system 300, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

Figure 5:
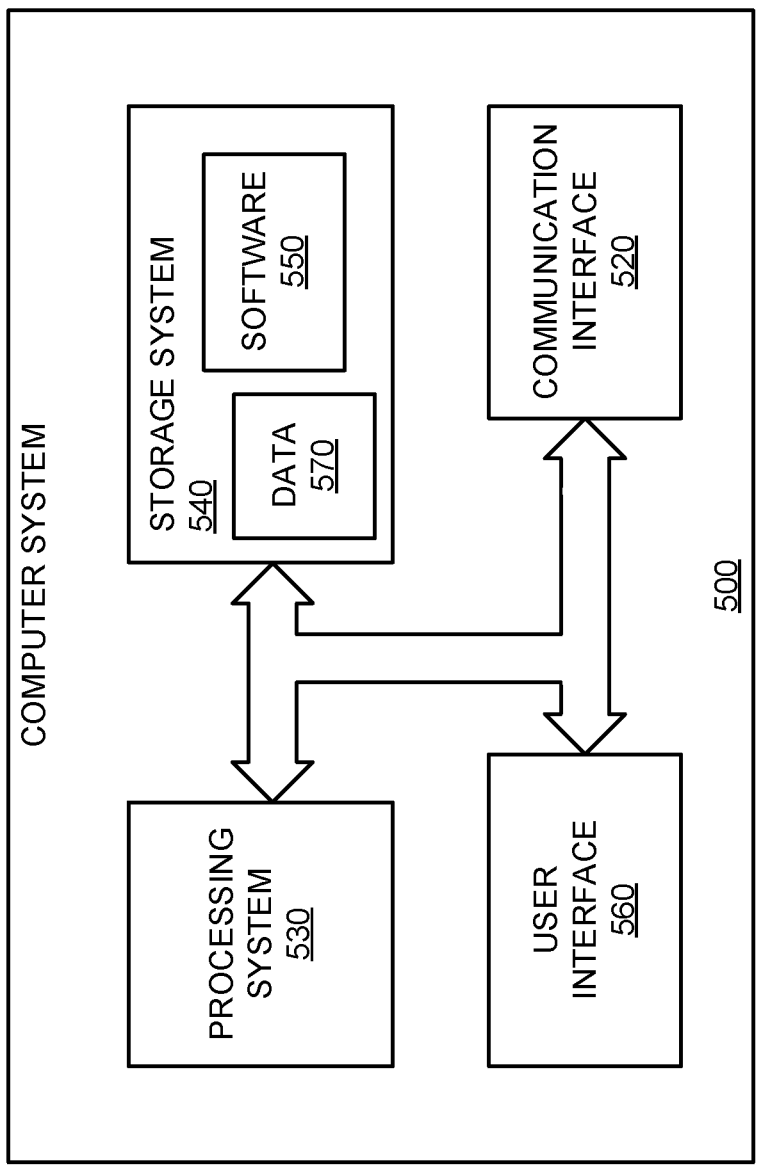
FIG. 5 is a block diagram of a computer system.

FIG. 5 illustrates a block diagram of an example computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein.

Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Processing system 530 may be an example of one or more of system 100, system 101, system 300, and/or their components.

Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 550 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1

An integrated circuit, comprising: a plurality of processor cores that share a common last-level cache, the plurality of processor cores each including a non-coherent memory order buffer, a first processor core being a one of the plurality of processor cores; and, a shared memory order buffer to receive coherent store transactions sent by the plurality of processor cores; the common last-level cache to receive store transactions sent by the non-coherent memory order buffers of the plurality of processor cores, the common last-level cache to also receive store transactions, from the shared memory order buffer, that correspond to the coherent store transactions sent by the plurality of processor cores.

Example 2

The integrated circuit of example 1, wherein the store transaction sent by the non-coherent memory order buffers of the plurality of plurality of processor cores include store transactions that have been processed by at least one lower-level cache before being sent to the last-level cache.

Example 3

The integrated circuit of example 1, wherein the coherent store transactions sent by the plurality of processor cores are to be sent directly to a shared memory order buffer based at least in part on addresses targeted by the coherent store transactions being within a configured address range.

Example 4

The integrated circuit of example 1, wherein the store transactions sent by the non-coherent memory order buffers are to be processed by a lower-level cache before being sent to the last-level cache based at least in part on addresses targeted by the store transactions sent by the non-coherent memory order buffers being within a configured address range.

Example 5

The integrated circuit of example 1, wherein the store transactions sent by the plurality of processor cores are to be sent directly to a shared memory order buffer based at least in part on addresses targeted by the store transactions being within an address range specified by at least one register that is writable by the first processor core.

Example 6

The integrated circuit of example 3, wherein the configured address range corresponds to at least one memory page.

Example 7

The integrated circuit of example 4, wherein the configured address range corresponds to at least one memory page.

Example 8

A method of operating a processing system, comprising: receiving, from a plurality of processor cores, a plurality of non-coherent store transactions at a common last-level cache, a first processor core being one of the plurality of processor cores; receiving, from the plurality of processor cores, a plurality of coherent store transactions at a memory order buffer; issuing, by the first processor core and directly to the memory order buffer, at least a first coherent store transaction, the first coherent store transaction to be processed by the memory order buffer before being sent to the last-level cache; issuing, by the first processor core, at least a first non-coherent store transaction, the first non-coherent store transaction to be processed by at least one lower-level cache before being sent to the last-level cache; and, receiving, at the last-level cache, the non-coherent store transaction and data stored by the coherent store transaction.

Example 9

The method of example 8, wherein the first processor core issues the first coherent store transaction based on an address corresponding to the target of a store instruction being executed by the first processor core falling within a configured address range.

Example 10

The method of example 9, wherein the configured address range corresponds to at least one memory page.

Example 11

The method of example 10, wherein a page table entry associated with the at least one memory page includes an indicator that the first processor core is to issue the first coherent store transaction.

Example 12

The method of example 9, further comprising: receiving, from a register written by a one of the plurality of processors, an indicator that corresponds to at least one limit of the configured address range.

Example 13

The method of example 8, wherein the first processor core issues the first non-coherent store transaction based on an address corresponding to the target of a store instruction being executed by the first processor core falling within a configured address range.

Example 14

The method of example 13, wherein the configured address range corresponds to at least one memory page.

Example 15

The method of example 14, wherein a page table entry associated with the at least one memory page includes an indicator that the first processor core is to issue the first non-coherent store transaction.

Example 16

The method of example 11, further comprising: receiving, from a register written by a one of the plurality of processors, an indicator that corresponds to at least one limit of the configured address range.

Example 17

A processing system, comprising: a plurality of processing cores each coupled to at least a first level cache; a last-level cache, separate from the first level cache, to receive a block of non-coherent store data from the first level cache; a memory order buffer, coupled to the last-level cache, to receive a block of coherent store data from a first processing core of the plurality of processing cores without the block of coherent store data being processed by the first level cache.

Example 18

The processing system of example 17, wherein an address range determines whether the block of coherent store data is to be sent to the memory order buffer without being processed by the first level cache.

Example 19

The processing system of example 17, wherein an indicator in a page table entry determines whether the block of coherent store data is to be sent to the memory order buffer without being processed by the first level cache.

Example 20

The processing system of example 17, an indicator in a page table entry determines whether the block of non-coherent store data is to be sent to the last-level cache without being processed by the memory order buffer.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. An integrated circuit, comprising:
a plurality of processor cores that share a common last-level cache, the plurality of processor cores each including a non-coherent memory order buffer, a first processor core being a one of the plurality of processor cores; and,
a shared memory order buffer directly coupled to each of the plurality of processor cores such that coherent store transactions sent by the plurality of processor cores are directly received at the shared memory order buffer without being processed by at least one lower-level cache;
the common last-level cache to receive store transactions sent by the non-coherent memory order buffers of the plurality of processor cores, the common last-level cache to also receive store transactions, from the shared memory order buffer, that correspond to the coherent store transactions sent by the plurality of processor cores.

2. The integrated circuit of claim 1, wherein the store transactions sent by the non-coherent memory order buffers of the plurality of plurality of processor cores include store transactions that have been processed by the at least one lower-level cache before being sent to the last-level cache.

3. The integrated circuit of claim 1, wherein the coherent store transactions sent by the plurality of processor cores are to be sent directly to the shared memory order buffer based at least in part on addresses targeted by the coherent store transactions being within a configured address range.

4. The integrated circuit of claim 1, wherein the store transactions sent by the non-coherent memory order buffers are to be processed by the at least one lower-level cache before being sent to the last-level cache based at least in part on addresses targeted by the store transactions sent by the non-coherent memory order buffers being within a configured address range.

5. The integrated circuit of claim 1, wherein the coherent store transactions sent by the plurality of processor cores are to be sent directly to the shared memory order buffer based at least in part on addresses targeted by the coherent store transactions being within an address range specified by at least one register that is writable by the first processor core.

6. The integrated circuit of claim 3, wherein the configured address range corresponds to at least one memory page.

7. The integrated circuit of claim 4, wherein the configured address range corresponds to at least one memory page.

8. A method of operating a processing system, comprising:
receiving, from a plurality of processor cores, a plurality of non-coherent store transactions at a common last-level cache, a first processor core being one of the plurality of processor cores;
receiving, from the plurality of processor cores, a plurality of coherent store transactions directly at a shared memory order buffer directly coupled to each of the plurality of processor cores;
issuing, by the first processor core and directly to the shared memory order buffer, at least a first coherent store transaction, the first coherent store transaction to be processed by the shared memory order buffer before being sent to the last-level cache and without being processed by at least one lower-level cache;
issuing, by the first processor core, at least a first non-coherent store transaction, the first non-coherent store transaction to be processed by the at least one lower-level cache before being sent to the last-level cache; and,
receiving, at the last-level cache, the non-coherent store transaction and data stored by the coherent store transaction.

9. The method of claim 8, wherein the first processor core issues the first coherent store transaction based on an address corresponding to the target of a store instruction being executed by the first processor core falling within a configured address range.

10. The method of claim 9, wherein the configured address range corresponds to at least one memory page.

11. The method of claim 10, wherein a page table entry associated with the at least one memory page includes an indicator that the first processor core is to issue the first coherent store transaction.

12. The method of claim 9, further comprising:
receiving, from a register written by a one of the plurality of processors, an indicator that corresponds to at least one limit of the configured address range.

13. The method of claim 8, wherein the first processor core issues the first non-coherent store transaction based on an address corresponding to the target of a store instruction being executed by the first processor core falling within a configured address range.

14. The method of claim 13, wherein the configured address range corresponds to at least one memory page.

15. The method of claim 14, wherein a page table entry associated with the at least one memory page includes an indicator that the first processor core is to issue the first non-coherent store transaction.

16. The method of claim 11, further comprising:
receiving, from a register written by a one of the plurality of processors, an indicator that corresponds to at least one limit of the configured address range.

17. A processing system, comprising:
a plurality of processing cores each coupled to at least a respective first level cache;
a last-level cache, separate from the first level caches, to receive a block of non-coherent store data from the first level caches;
a shared memory order buffer, directly coupled to each of the plurality of processing cores and to the last-level cache, to receive a block of coherent store data from a first processing core of the plurality of processing cores without the block of coherent store data being processed by the first level caches.

18. The processing system of claim 17, wherein an address range determines whether the block of coherent store data is to be sent to the shared memory order buffer without being processed by the first level caches.

19. The processing system of claim 17, wherein an indicator in a page table entry determines whether the block of coherent store data is to be sent to the shared memory order buffer without being processed by the first level caches.

20. The processing system of claim 17, wherein an indicator in a page table entry determines whether the block of non-coherent store data is to be sent to the last-level cache without being processed by the shared memory order buffer.

\* \* \* \* \*